(12) United States Patent
Kanazawa

(10) Patent No.: US 6,839,781 B1
(45) Date of Patent: Jan. 4, 2005

(54) WIRELESS KEYBOARD AND INFORMATION PROCESSING DEVICE HAVING THE SAME

(75) Inventor: Yukiko Kanazawa, Gunma (JP)

(73) Assignee: NEC Corporation, Tokyo (JP)

( * ) Notice: Subject to any disclaimer, the term of this patent is extended or adjusted under 35 U.S.C. 154(b) by 396 days.

(21) Appl. No.: 09/717,886

(22) Filed: Nov. 21, 2000

(30) Foreign Application Priority Data

Nov. 22, 1999 (JP) .......................................... 11-331327

(51) Int. Cl.[7] ............................................. G06F 13/12
(52) U.S. Cl. ............................ 710/67; 710/15; 710/62; 710/72; 710/73; 348/14.02; 348/211.2; 463/39
(58) Field of Search .............................. 710/15, 62, 67, 710/72, 73; 348/14.02, 211.2; 463/39

(56) References Cited

U.S. PATENT DOCUMENTS

| | | | | |
|---|---|---|---|---|
| 5,838,720 A | * | 11/1998 | Morelli ........................ | 375/219 |
| 5,999,799 A | * | 12/1999 | Hu et al. .................... | 455/67.7 |
| 6,138,050 A | * | 10/2000 | Schneider et al. ............ | 700/84 |
| 6,445,684 B1 | * | 9/2002 | Schwengler et al. ........ | 370/311 |
| 6,529,556 B1 | * | 3/2003 | Perdue et al. ................ | 375/260 |

FOREIGN PATENT DOCUMENTS

| | | | | |
|---|---|---|---|---|
| JP | 63-189924 | 8/1988 | | |
| JP | 63-200933 | 12/1988 | | |
| JP | 02-235499 | 9/1990 | | |
| JP | 04-236541 | 8/1992 | | |
| JP | 08-163038 | 6/1996 | | |
| JP | 09-083662 | 3/1997 | | |
| JP | 10-164274 | 6/1998 | | |
| JP | 10-178500 | 6/1998 | | |
| JP | 10-275043 | 10/1998 | | |
| JP | 10-321334 | 12/1998 | | |
| JP | 411175238 A | * | 7/1999 | ............. G06F/3/02 |

* cited by examiner

Primary Examiner—Jeffrey Gaffin
Assistant Examiner—Justin Knapp
(74) Attorney, Agent, or Firm—Scully, Scott, Murphy & Presser

(57) ABSTRACT

A wireless keyboard has a transmitting and receiving portion 12 for transmitting an input data D to an information processing device 2 and receiving a reception level from the information processing device 2, a transmission level setting portion 14 for storing the transmission level of the input data D, setting a new transmission level referring to the transmission level setting table in response to the combination of the stored transmission level and the reception level on receiving the reception level and detecting a distance information with respect to the information processing device 2 referring to a distance information table, a transmission level switching portion 15 for switching the transmission level of the input data D to a new transmission level, an LCD indicating portion 16 for receiving and indicating the distance information, a timer 13 for output a time-out signal in the event the reception level is not transmitted even a fixed period of time passed after the input data D is transmitted and an indication LED 17 for indicating the communications failure by receiving the above-mentioned time-out signal.

15 Claims, 4 Drawing Sheets

FIG. 4

| RECEPTION LEVEL / TRANSMISSION LEVEL | HIGH | MID | LOW |
|---|---|---|---|
| HIGH | LOW | MID | HIGH |
| MID |  | LOW | MID |
| LOW |  |  | LOW |

FIG. 5

| TRANSMISSION LEVEL | RECEPTION LEVEL | DISTANCE INFORMATION |
|---|---|---|
| HIGH | HIGH | SHORT DISTANCE |
|  | MID | MEDIUM DISTANCE |
|  | LOW | LONG DISTANCE |
| MID | HIGH | SHORT DISTANCE |
|  | MID | MEDIUM DISTANCE |
| LOW | LOW | LONG DISTANCE |

WIRELESS KEYBOARD AND INFORMATION PROCESSING DEVICE HAVING THE SAME

BACKGROUND OF THE INVENTION

The present invention relates to a wireless keyboard, an information processing device having the wireless keyboard as means for input and transmission level switching system provided therein, particularly to a wireless keyboard, an information processing device having the wireless keyboard as means for input provided therein and transmission level switching system to achieve power conservation considering usability of users.

Conventionally, wireless keyboards are generally provided as one kind of input devices with respect to information processing devices as a computer, and the like. The conventional wireless keyboard has advantages of requiring no cable connected to the information processing device and being able to key-input away from the information processing device. However, in some occasions, an input from a wireless keyboard to an information processing device is hindered by communication incapability depending on a relation between positions of the information processing device and the wireless keyboard. This is a problem raised by an uncertainty that the user would not know the conditions of reception level of the keyboard-input in the information processing device, that is, an uncertainty how far the communications is conducted normally or where the position suitable for conducting communications is.

Transmission level of the wireless keyboard for transmitting radio signal, such as infrared rays, radio wave and the like, is kept at a fixed level (the maximum level) at all time regardless of the distance to the information processing device. Accordingly, there is another a problem that undesired electric power is consumed by transmitting radio signal at the maximum level even when the wireless keyboard is placed very close to the information processing device requiring radio signal at lower level.

Among the above-mentioned problems, considering the problem that the user would not know the conditions of the reception level of keyboard-input in the information processing device, one solution is given by an information processing device disclosed in unexamined Japanese Patent Publication No. Hei 11-212706.

According to the above-mentioned publication, the information processing device receives data transmitted in the form of radio from a keyboard by a receiving portion therein and processes the data to obtain a sampling value. And the information processing device determines the communication range to the keyboard by comparing the sampling value with several standard reference values and indicates the results by an indicator thereof, for example, short range is indicated by green, medium range is indicated by yellow and long range is indicated by red. Accordingly, users can check the current operation range visually.

The information processing device described in the above-mentioned unexamined Japanese Patent Publication No. Hei 11-212706 is capable of indicating the communication range of a short, a medium or a long distance between a wireless keyboard and the information processing device. However, as the indicator is accommodated in the information processing device, there is a problem that the user operating the keyboard away from the information processing device has difficulty in checking the indications visually. And the prior art has not solved the problem of undesired consumption of electricity by transmitting the radio signal at a fixed level (the maximum level) at al time.

SUMMARY OF THE INVENTION

It is therefore an object of the present invention to provide a wireless keyboard, an information processing device having the wireless keyboard as means for input therein and transmission level switching system.

Other objects of the present invention will become clear as the description proceeds.

A first wireless keyboard of the present invention is a wireless keyboard in which an input signal input by operation of keys provided on the keyboard is transmitted from a transmitting portion provided in the above-mentioned keyboard to the information processing device. In addition, the above-mentioned first wireless keyboard of the present invention is characterized in having a receiving portion for receiving the above-mentioned input-signal from the above-mentioned information processing device at a reception level and transmitting the above-mentioned input-signal at a transmission level by switching in response to the combination of the transmission level of the above-mentioned input-signal transmitted from the above-mentioned transmitting portion and the reception level received in the above-mentioned receiving portion.

A second wireless keyboard of the present invention is a wireless keyboard in which an input signal input by operation of keys provided on the keyboard is transmitted from a transmitting portion provided in the above-mentioned keyboard to the information processing device. And the above-mentioned second wireless keyboard of the present invention is characterized in providing a main body of the above-mentioned keyboard having;

a receiving portion for receiving a reception level of the above-mentioned input-signal from the above-mentioned information processing device, a transmission level setting portion for storing the reception level of the above-mentioned input-signal transmitted from the above-mentioned transmitting portion and for setting a new transmission level referring to the transmission level setting table predetermined in response to the combination of the above-mentioned transmission level and the above-mentioned reception level on receiving the reception level from the above-mentioned receiving portion and a transmission level switching portion for receiving the new transmission level set in the above-mentioned transmission level setting portion and for switching the transmission level of the input-signal transmitted through the above-mentioned transmitting portion to a new transmission level.

A third wireless keyboard of the present invention is a wireless keyboard in which an input signal input by operation of keys provided on the keyboard is transmitted from a transmitting portion provided in the above-mentioned keyboard to the information processing device. And the above-mentioned wireless keyboard of the present invention is characterized in providing the main body of the above-mentioned keyboard having;

a receiving portion for receiving the above-mentioned input-signal from the above-mentioned information processing device at a reception level, a transmission level setting portion for storing the reception level of the above-mentioned input-signal transmitted from the above-mentioned transmitting portion, for setting a new transmission level referring to the transmission level setting table predetermined in response to the combination of the above-mentioned transmission level and the and the above-mentioned reception level on receiving the reception level from the above-mentioned receiving portion and for detecting the distance information to the information processing device referring to the distance information table predetermined in response to the combination of the above-mentioned transmission level and the above-mentioned reception level, a transmission level switching portion for receiving the new transmission level set in the above-mentioned transmission level setting portion and switching the transmission level of the input-signal transmitted through the above-mentioned transmitting portion to a new transmission level and a distance information indicating portion for receiving and indicating the above-mentioned distance information.

A fourth wireless keyboard of the present invention is characterized in that the second or third wireless keyboard of the present invention additionally has;

a timer for counting a time period from the above-mentioned input-signal is transmitted to the above-mentioned reception level is received by the above-mentioned transmitting portion and for outputting a time-out signal in the event the above-mentioned reception level is not transmitted within a fixed period of time and a communication incapability indicating portion for indicating the incapability in the communication by receiving the above-mentioned time-out signal in the second or the third wireless keyboard of the present invention.

A fifth wireless keyboard of the present invention is characterized in that the above-mentioned transmitting setting table in the second, third or forth wireless keyboard of the present invention is set to provide the minimum transmission level which the above-mentioned information processing device can receive and detect at the above-mentioned distance by each combination of the above-mentioned transmission level and the above-mentioned reception level by detecting the distance information to the above-mentioned information processing device in response to the combination of the above-mentioned transmission level and the above-mentioned reception level.

A sixth wireless keyboard of the present invention is characterized in that the second, third or fourth wireless keyboard of the present invention additionally has an integrated battery and means for switching the power supply by user's operation to halt the power supply from the above-mentioned integrated battery to a designated internal circuit by the above-mentioned means for switching the power supply under user's operation.

A first information processing device having the wireless keyboard of the present invention as means for input is characterized in that the main body of the information processing device has a receiving portion for receiving input-signal transmitted from the wireless keyboard, a reception level detecting portion for detecting and outputting the reception level on receiving the above-mentioned input-signal and a transmitting portion for transmitting the reception level output from the above-mentioned reception level detecting portion.

A second information processing device having the wireless keyboard of the present invention as means for input is characterized in that the above-mentioned transmitting portion transmits the reception level output from the above-mentioned reception level detecting portion in sequence at regular intervals in the first information processing device having the wireless keyboard of the present invention as means for input.

Transmission level switching system of the present invention is characterized in having one of the second through sixth wireless keyboard of the present invention and one of the first or second information processing device of the present invention.

BRIEF DESCRIPTION OF THE DRAWINGS

FIG. 4 is a diagram for illustrating the setting of transmission level in a preferred embodiment of the present invention; and FIG. 5 is a diagram for illustrating distance information in a preferred embodiment of the present invention.

DETAILED DESCRIPTION OF THE PREFERRED EMBODIMENT

Figure 1:
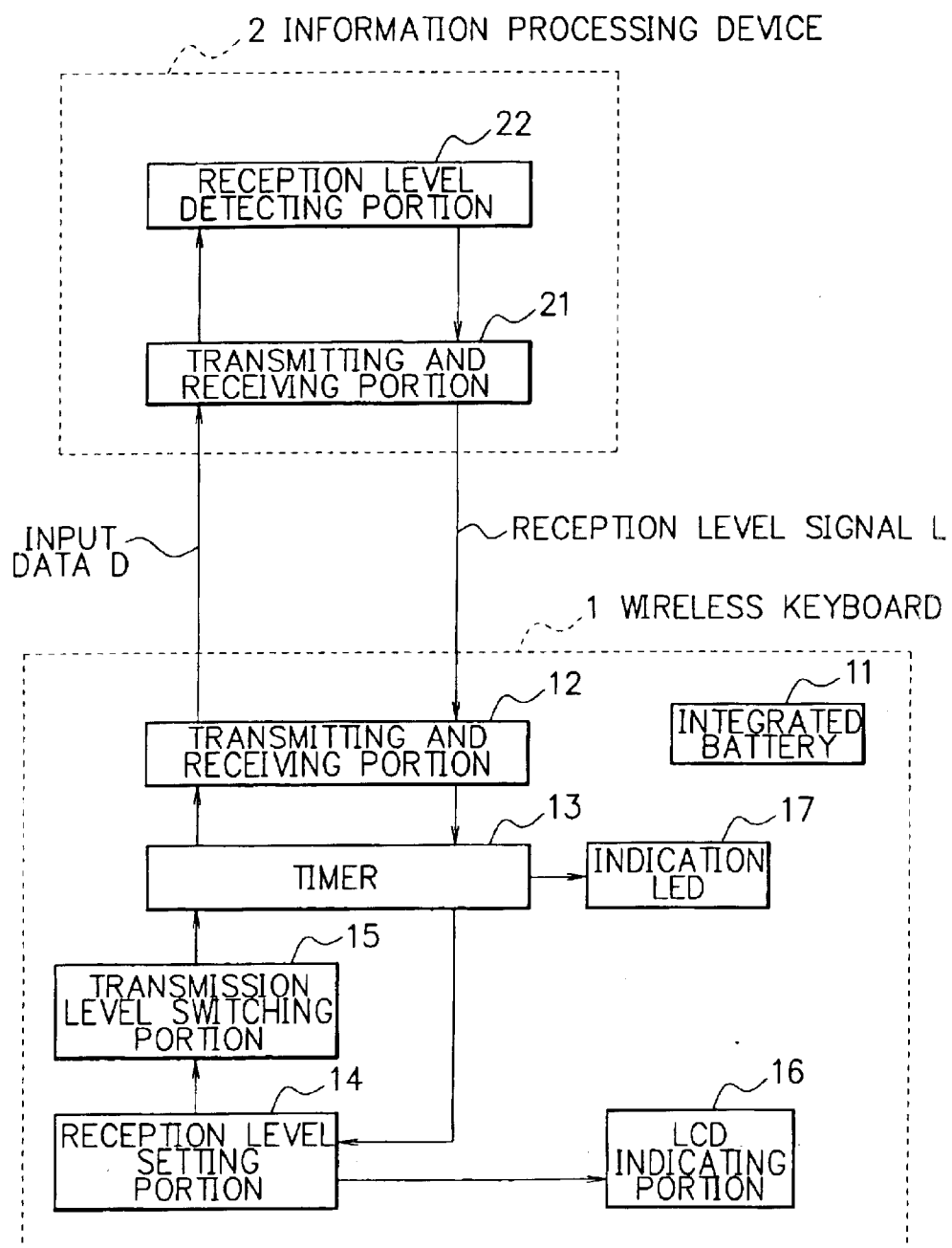
FIG. 1 is a block diagram for showing the composition of a preferred embodiment of the present invention.

Now referring to the drawings, preferred embodiments of the present invention is described.

FIG. 1 is a block diagram for showing the composition of a preferred embodiment of the present invention in which a wireless keyboard 1 and an information processing device 2 as computer, and the like having the wireless keyboard 1 as means for input therein are provided.

The wireless keyboard 1 comprises an integrated battery 11 for supplying power to internal circuits in the wireless keyboard 1, a transmitting and receiving portion 12 for transmitting the input data D input by a user through the wireless keyboard 11 and receiving the reception level signal L from a transmitting and receiving portion 21 of the information processing device 2, a timer 13 for counting the time period from the time that the transmitting and receiving portion 12 transmits the data D until the time that the transmitting and receiving portion 12 receives the reception level signal L and transmitting an alarm signal to an indication LED 17 in the event the reception level signal L is not transmitted within a predetermined period of time, a transmission level setting portion 14 for setting the transmission level by receiving the reception level signal L from the transmitting and receiving portion 21 and for transmitting the distance information with respect to the information processing device 2 according to the relation between the transmission level and the reception level to a LCD indicating portion 16, a transmission level switching portion 15 for transmitting a transmission level switching signal to the transmitting and receiving portion 12 based on the information sent from the transmission level setting portion 14, the LCD indicating portion 16 for indicating the distance information sent from the transmission level setting portion 14 and an indication LED 17 for lighting LED on receiving the alarm signal from the timer 13.

The information processing device 2 comprises the transmitting and receiving portion 21 for transmitting the input data D to the reception level detecting portion 22 by receiving the input data D transmitted from the wireless keyboard 1 and for transmitting the detected level determined at the reception level detecting portion 22 to the wireless keyboard 1 at regular intervals, and the reception level detecting portion 22 for sending the result of determining the reception level of the input data D to the transmitting and receiving portion 21.

Figure 2:
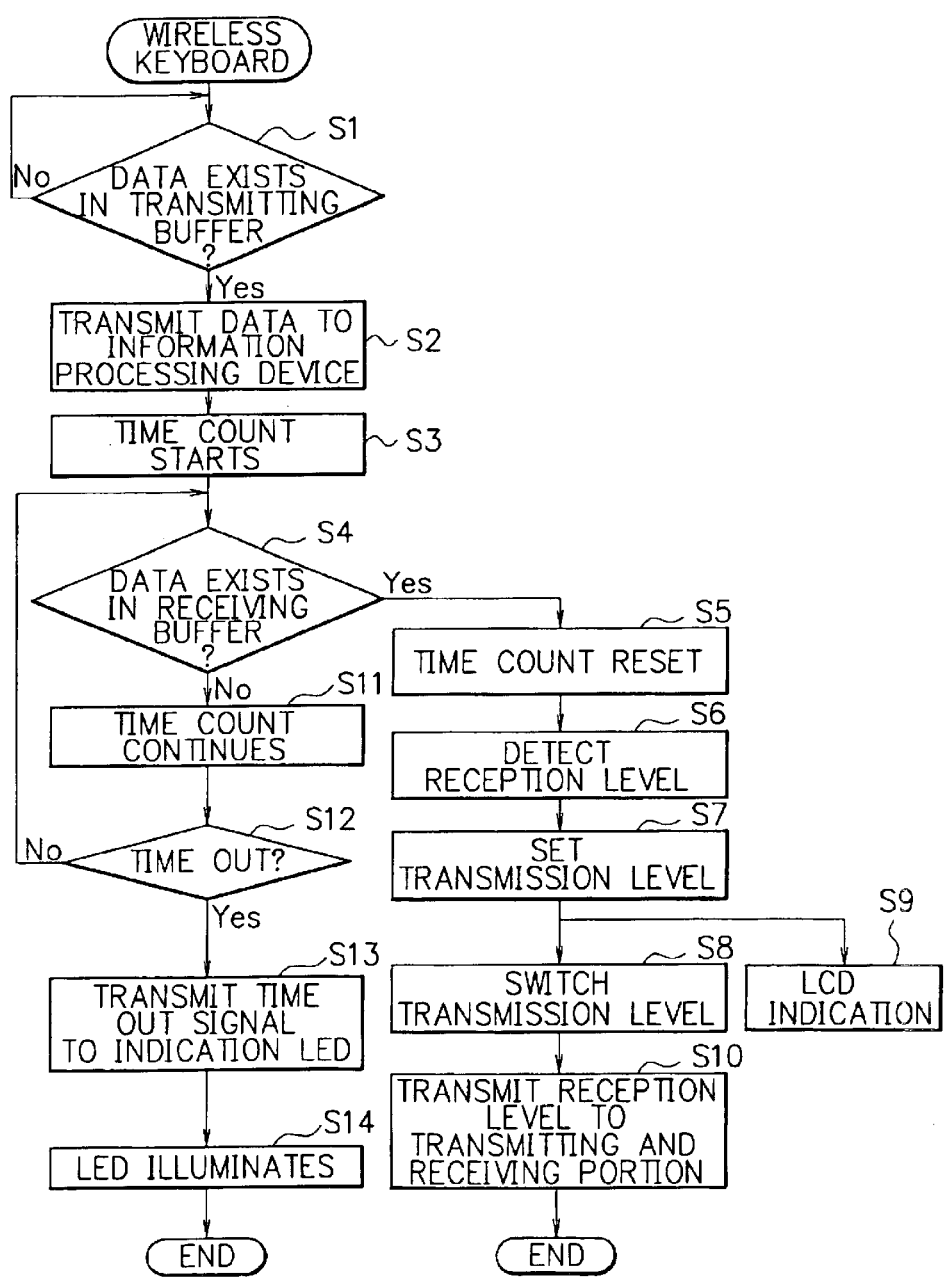
FIG. 2 is a flowchart for showing the operation on a side of a wireless keyboard in a preferred embodiment of the present invention.
Figure 3:
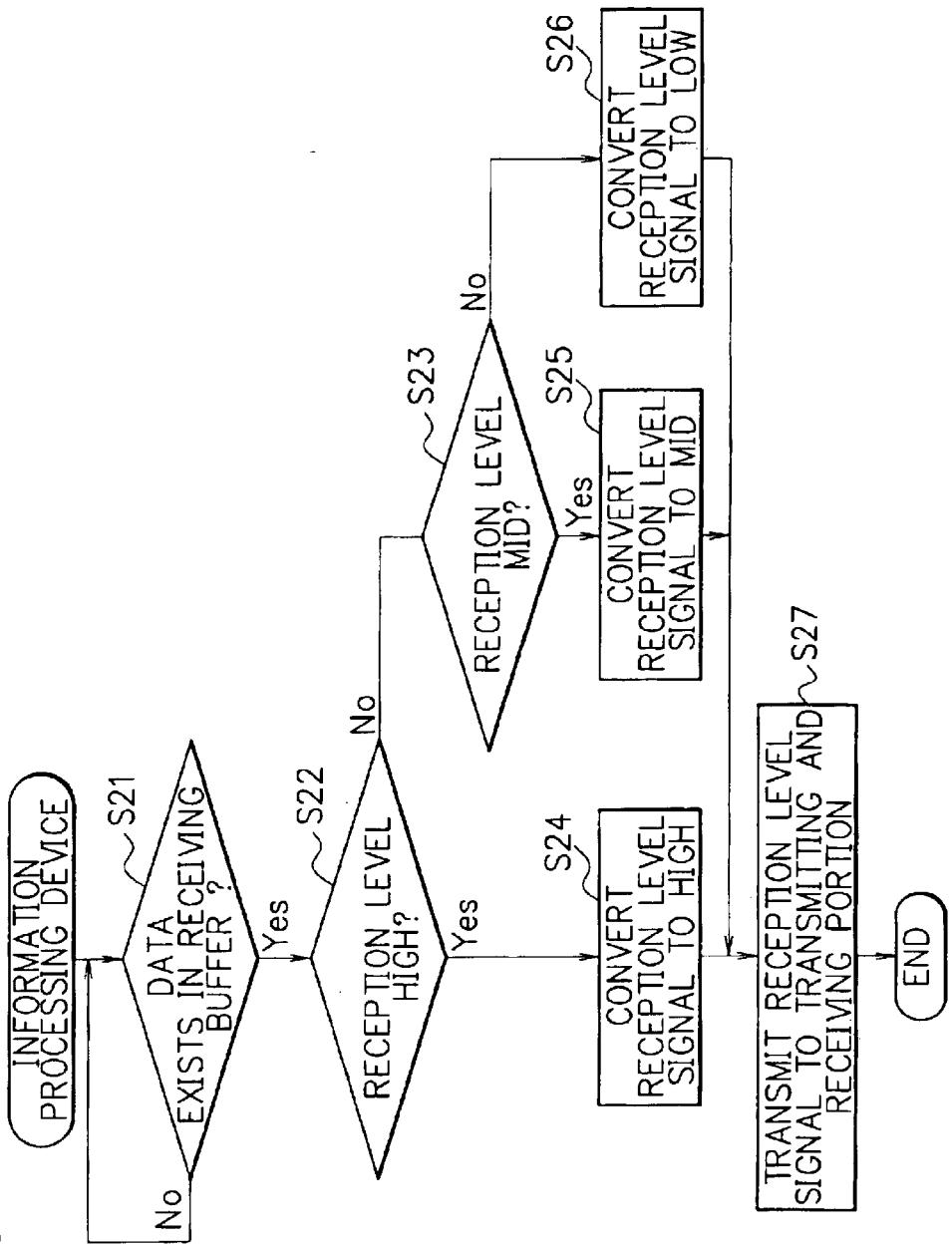
FIG. 3 is a flowchart for showing the operation on a side of a preferred information processing device in an embodiment of the present invention.

Next, referring to the FIG. 1 through 4 an operation of a preferred embodiment of the present invention is described in detail. FIG. 2 is a flowchart for showing an operation on a side of the wireless keyboard in a preferred embodiment of the present invention, FIG. 3 is a flowchart for showing an operation on a side of the information processing device in the embodiment of the present invention and FIG. 4 is a view for showing the setting of transmission level in the embodiment of the present invention.

At first, the operation on the side of the wireless keyboard is described corresponding to the flowchart of FIG. 2.

Data input by a user through the keyboard 1 are sent to transmitting buffer which is not shown in the drawings in the transmitting and receiving portion 12 and the transmitting and receiving portion 12 transmits the data D to the information processing device 2 after verifying the data existing in the transmitting buffer. At this time, an initial value of the transmission level switching portion 15 is high and the first transmission is performed at high level accordingly. Incidentally, in the present embodiment, for convenience of n explanation, the transmission level is fixed in three levels of high, mid and low and the transmission level is receivable and detectable normally in any level on the side of the information processing device 2 in a short range to the wireless keyboard 1 (steps S1 and S2).

When the input data D is transmitted to the information processing device 2, the transmitting and receiving portion 12 commands the timer 13 to start counting the time period (step S3).

Next, the transmitting and receiving portion 12 verifies the data exists in the receiving buffer which is not shown in the transmitting and receiving portion 12. As will be followed, when the information processing device 2 transmits the data to the wireless keyboard 1, the data is stored in the receiving buffer in the transmitting and receiving portion 12, because the information processing device 2 detects the reception level of the input data on receiving from the wireless keyboard 1 and transmits the reception level signal L back to the transmitting and receiving portion 12 in the wireless keyboard 1 (step S4).

In step 4, when the data is stored in the receiving buffer, the transmitting and receiving portion 12 commands the timer 13 to reset the previous counting (step S5) and transmits the reception level signal L from the information processing device 2 to the transmission level setting portion 14 (step S6).

After receiving the reception level signal L, the transmission level setting portion 14 compares the reception level with the transmission level of the input data D which corresponds to the above-mentioned reception level. Then the transmission level setting portion 14 sets a new transmission level referring to the transmission level setting table (FIG. 4) predetermined in response to the combination of the above-mentioned transmission level and the above-mentioned reception level. The transmission level setting table shown in FIG. 4 is provided in the transmission level setting portion 14. Incidentally, the above-mentioned transmission level setting portion 14 stores the transmission level of the immediately preceding input data and sets the new transmission level based on the above-mentioned input data and the reception level returned from the information processing device 2 (step S7).

Now, the setting of transmission level by the transmission level setting portion 14 is described referring to FIG. 4.

At first, allowable minimum range for the transmission level and the reception level to be transmitted and received between the information processing device 2 and the wireless keyboard 1 are divided into 3 levels of a short, a medium and a long range according to a relation between the transmission level and the reception level. And the reception level detecting portion 22 determines the transmitting and the reception level to be equal in the event of short range. And the reception level detecting portion determines that the reception level is one level lower than the transmission level in the event of medium range, for example, the reception level is mid when the transmission level is high, the reception level is low when the transmission level is mid and the reception level is not detectable when the transmission level is low. Further, the reception level is determined two levels lower than the transmission level in the event of the long range, for example, the reception level is low when the transmission level is high and the reception level is not detectable when the transmission level is mid or low.

For one example, the transmission level is high at the initial value and a first input data is accordingly output at high level. Then the information processing device 2 determines the reception level. In the above-mentioned event that the reception level returns to the keyboard 1 at low level, for example, the information processing device 2 sets a new transmission level at high by combining the transmission level at high and the reception level at low as shown in FIG. 4. It is appeared that the range is long according to the reception level being 2 level lower than the transmission level and the transmission level must be high to be detected on the side of the information processing device 2.

And for another example, when the transmission level is high and the reception level is high as shown in FIG. 4, a new transmission level is set at low. It is appeared that the range is short according to the reception level being equal to the transmission level and transmission at low level is received at low level. Thus, the distance information between the information processing device 2 and the wireless keyboard 1 is detected according to the relation between the transmission level and the reception level. And the allowable minimum transmission level for the information processing device 2 to be received and detected normally is set. Accordingly, it is possible to reduce undesired power consumption by transmitting radio signal at a fixed level (high level).

Next, descriptions are started from the step 8 returning to the flowchart of FIG. 2.

After setting a new transmission level, the transmission level setting portion 14 sends the new transmission level with respect to the transmission level switching portion 15. Then the transmission level switching portion 15 switches the transmission level to a new level sent from the transmission level setting portion 14 (step S8).

The transmission level setting portion 14 compares the reception level with the transmission level of the input data D corresponding to the reception level in parallel with the step 8. And referring to the distance information table (FIG. 5) predetermined in response to the combination of the above-mentioned transmission level and the above-mentioned reception level, the transmission level setting portion 14 sends an information which range of short, medium or long is determined between the wireless keyboard 1 and the information processing device 2 according to the relation between the transmission level and the reception level to LCD indicating portion 16 for indicating the distance information thereby. Incidentally, the distance information table shown in FIG. 5 is provided in the transmission level setting portion 14 (step S9).

The transmitting and receiving portion 12 transmits a new data input through the wireless keyboard 1 to the information processing device 2 at a level switched in the step 8 (step S10).

Incidentally, in the step 4, when there is no data in the receiving buffer, the timer 13 continues time-counting. And the reason is the wireless keyboard 1 is placed out of the allowable range for communicating and the information processing device 2 can not receive the input data transmitted from the wireless keyboard 1 or the reception level is too low to detect and the reception level signal L can not return to the wireless keyboard 1 (step S11).

When there is no data in the receiving buffer within a predetermined fixed time, it is time-out (step S12) and the timer 13 transmits the time-out signal to an indication LED 17 (step S13).

The indication LED 17 lights the LED on receiving the time-out signal. Users recognize the position is out of allowable range for communicating by the indication LED 17 illuminating. The timer 13 halts the time-out signal on receiving the reception level signal L from the information processing device 2 and also halts the indication of the indication LED 17 (step S14).

Next, an operation of the information processing device 2 is described corresponding to the flowchart of FIG. 3.

The transmitting and receiving portion 21 detects whether the input data D transmitted from the wireless keyboard 1 exists in the receiving buffer which is not shown in the transmitting and receiving portion 21 (step S21).

In the event the data exists, in the step S21, the data is sent to the reception level detecting portion 22 and the reception level detecting portion 22 determines the reception level of the data sent in three levels of high, mid and low. In the above-mentioned determination, the transmission level and the reception level is determined to be equal in a short range, the reception level is determined to be one level lower than the transmission level in a medium range and the reception level is determined to be two level lower than the transmission level in a long range, as mentioned above. The standard reference value for the determination is also predetermined to obtain the similar result as above. And the reception level detecting portion 22 sends the determined reception level to the transmitting and receiving portion 21 as the reception level signal L (step S22 through S26).

The transmitting and receiving portion 21 transmits the reception level signal L sent from the reception level detecting portion 22 to the transmitting and receiving portion 12 of the wireless keyboard 1 (step S27).

An embodiment of the present invention has been described above. It is possible to control the power supply with attention to every detail by the transmitting (receiving) level of n (n: natural number) other than three levels. Or it is also possible to arrange the indicating portion for indicating the distance information or out-of-range communications in other portion than LCD/LED and to share the use of indicating portion for both purpose. Further, it is obvious that abnormal conditions (out-of-range communications) can be indicated by means for indication other than illumination.

Though it has been described that the detecting level determined in the reception level detecting portion 22 is transmitted from the transmitting and receiving portion 21 to the wireless keyboard 1 at regular intervals, the detecting level can be transmitted to the wireless keyboard 1 on each receiving from the reception level detecting portion 22 by the transmitting and receiving portion 22.

Further, it is possible to extend the driving time of the integrated battery in the wireless keyboard 1 by providing a power supply switching circuit operated by users and halting the receiving circuit in the transmitting and receiving portion 12 or a circuit for LCD indication on occasion of un-required.

A first effect according to the present invention is to detect the distance information between an information processing device and a wireless keyboard according to the relation of a transmission level with a reception level, to set the allowable minimum transmission level for the information processing device to receive and detect normally at the above-mentioned range. Therefore, it is possible to reduce the consumable power of the wireless keyboard.

A second effect according to the present invention is that the indication became easier to be seen by indicating the distance information between the information processing device and the wireless keyboard on the wireless keyboard and that users can recognize the indication easier during key-operation. Thus, users know how long the wireless keyboard can communicate with the information device easily.

And a third effect according to the present invention is that the determination whether the range between the wireless keyboard and the information device is within or out of the allowable range for conducting communications by providing an indication LED for indicating the out-of-range communications.

What is claimed is:

1. A wireless keyboard for use in transmitting an input signal input by operation of keys thereof to an information processing device, comprising:

transmitting means for transmitting said input signal input by operation of said keys to said information processing device at a predetermined transmission level;

receiving means for receiving a reception level of said input signal from said information processing device; and said predetermined transmission level of said input signal being increased, decreased or maintained dependent on both the transmission level of said input signal and the reception level received in said receiving means.

2. A wireless keyboard for use in transmitting an input signal input by operation of keys thereof to an information processing device, comprising:

transmitting means for transmitting said input signal input by operation of said keys to said information processing device at a predetermined transmission level;

receiving means for receiving a reception level of said input signal from said information processing device;

first transmission level setting means for storing the transmission level of said input signal transmitted from said transmitting means and setting a new transmission level with reference to a predetermined transmission level setting table in accordance with both said transmission level and said reception level upon receiving the reception level from said receiving means; and transmission level switching means for receiving a new transmission level set by said transmission level setting means and increasing, decreasing or maintaining the transmission level of the input signal transmitted through said transmitting means, according to both the transmission level of said input signal and the reception level received in said receiving means.

3. A wireless keyboard as claimed in claim 2, further comprising:
   a timer for counting a time period from a first time that said input signal is transmitted from said transmitting means to a second time that said reception level is received by said receiving means and for outputting a time-out signal in the event said reception level is not transmitted within a predetermined time period; and
   communication failure indicating means for indicating the communication failure upon receiving the time-out signal.

4. A wireless keyboard as claimed in claim 3, wherein said transmission level setting table has a minimum transmission level which is set therein and which can be received and detected normally by said information processing device even in the distance information between said wireless keyboard and said information processing device detected by said second transmission level setting means.

5. A wireless keyboard as claimed in claim 3, further comprising an integrated battery and power supply switching means for switching power supply by an operation of a user, wherein the power supply from said integrated battery to an internal circuit is stopped by said power supply switching means by the operation of the user.

6. A wireless keyboard as claimed in claim 2, further comprising an integrated battery and power supply switching means for switching power supply by an operation of a user, wherein the power supply from said integrated battery to an internal circuit is stopped by said power supply switching means by the operation of the user.

7. A wireless keyboard for use in transmitting an input signal input by operation of keys thereof to an information processing device, comprising:
   transmitting means for transmitting said input signal input by operation of said keys to said information processing device at a predetermined transmission level;
   receiving means for receiving a reception level of said input signal from said information processing device;
   second transmission level setting means for storing the transmission level of said input signal transmitted from said transmitting means and setting a new transmission level with reference to a predetermined transmission level setting table in accordance with both said transmission level and said reception level upon receiving the reception level from said receiving means, said second transmission level setting means detecting a distance information between said wireless keyboard and said information processing device with reference to a predetermined distance information table in accordance with both said transmission level and said reception level upon receiving said reception level from said receiving means;
   transmission level switching means for receiving a new transmission level set by said transmission level setting means and increasing, decreasing or maintaining the transmission level of the input signal transmitted through said transmitting means according to both the transmission level of said input signal and the reception level received in said receiving means; and
   a distance information display means for displaying said distance information upon receiving said distance information.

8. A wireless keyboard as claimed in claim 7, further comprising:
   a timer for counting a time period from a first time that said input signal is transmitted from said transmitting means to a second time that said reception level is received by said receiving means and for outputting a time-out signal in the event said reception level is not transmitted within a predetermined time period; and
   communication failure indicating means for indicating the communication failure upon receiving the time-out signal.

9. A wireless keyboard as claimed in claim 8, wherein said transmission level setting table has a minimum transmission level which is set therein and which can be received and detected normally by said information processing device even in the distance information between said wireless keyboard and said information processing device detected by said second transmission level setting means.

10. A wireless keyboard as claimed in claim 8, further comprising an integrated battery and power supply switching means for switching power supply by an operation of a user, wherein the power supply from said integrated battery to an internal circuit is stopped by said power supply switching means by the operation of the user.

11. A wireless keyboard as claimed in claim 7, wherein said transmission level setting table has a minimum transmission level which is set therein and which can be received and detected normally by said information processing device even in the distance information between said wireless keyboard and said information processing device detected by said second transmission level setting means.

12. A wireless keyboard as claimed in claim 7, further comprising an integrated battery and power supply switching means for switching power supply by an operation of a user, wherein the power supply from said integrated battery to an internal circuit is stopped by said power supply switching means by the operation of the user.

13. An information processing device having a wireless keyboard operable as input means, said information processing device comprising:
   a receiving portion for receiving an input signal transmitted from said wireless keyboard;
   a reception level detecting portion for detecting and outputting the reception level upon receiving said input signal; and
   a transmitting portion for transmitting said reception level outputted from said reception level detecting portion to said wireless keyboard, said wireless keyboard increasing, decreasing or maintaining the transmission level of the input signal transmitted from said wireless keyboard according to both said transmission level and said reception level.

14. An information processing device as claimed in claim 13, wherein said transmitting portion transmits said reception level in sequence at regular intervals.

15. A transmission level switching system comprising a combination of the wireless keyboard as claimed in claim 2 and the information processing device as claimed in claim 13.

* * * * *